(12) United States Patent
Singh et al.

(10) Patent No.: US 11,002,989 B2
(45) Date of Patent: May 11, 2021

(54) DEVICE AND METHOD FOR ADJUSTING THE POSITION OF EYEGLASSES ON THE FACE OF A USER

(71) Applicants: Devika Singh, Bethesda, MD (US); Andrew Howard Schulick, Bethesda, MD (US)

(72) Inventors: Devika Singh, Bethesda, MD (US); Andrew Howard Schulick, Bethesda, MD (US)

(*) Notice: Subject to any disclaimer, the term of this patent is extended or adjusted under 35 U.S.C. 154(b) by 29 days.

(21) Appl. No.: 16/261,410

(22) Filed: Jan. 29, 2019

(65) Prior Publication Data

US 2019/0235271 A1 Aug. 1, 2019

Related U.S. Application Data

(60) Provisional application No. 62/624,153, filed on Jan. 31, 2018.

(51) Int. Cl.
*G02C 5/12* (2006.01)

(52) U.S. Cl.
CPC ............ *G02C 5/124* (2013.01); *G02C 5/126* (2013.01); *G02C 2200/02* (2013.01)

(58) Field of Classification Search
CPC .......... G02C 5/12; G02C 5/122; G02C 5/124; G02C 5/126

USPC .................................. 351/55, 128, 137, 138
See application file for complete search history.

(56) References Cited

U.S. PATENT DOCUMENTS

| 1,540,627 | A | * | 6/1925 | Holmes | ................... | G02C 5/02 |
|---|---|---|---|---|---|---|
| | | | | | | 351/130 |
| 2,370,843 | A | * | 3/1945 | Croninger | .............. | G02C 5/124 |
| | | | | | | 351/138 |
| 2,428,961 | A | * | 10/1947 | Courney | ................ | G02C 5/124 |
| | | | | | | 351/55 |
| 2002/0067461 | A1 | * | 6/2002 | Bell | ....................... | G02C 5/124 |
| | | | | | | 351/128 |
| 2005/0052614 | A1 | * | 3/2005 | Negishi | .................. | G02C 5/124 |
| | | | | | | 351/137 |
| 2017/0139228 | A1 | * | 5/2017 | Singh | ..................... | G02C 5/124 |

* cited by examiner

*Primary Examiner* — Darryl J Collins
(74) *Attorney, Agent, or Firm* — Kim IP Law Group LLC

(57) ABSTRACT

A device for adjusting a position of eyeglasses on a face of a user is provided. The device includes a body having proximal and distal ends, the body being provided with a pronounced bow; at least one nose engaging member provided on the proximal end of the body, the nose engaging member being structured to engage with a bridge of a nose of the user; and at least one frame engaging member provided on the distal end of the body, the frame engaging member being structured to engage with the frame of the eyeglasses, wherein the pronounced bow of the body is structured to adjust a horizontal position of the eyeglasses with respect to the face of the user.

20 Claims, 17 Drawing Sheets

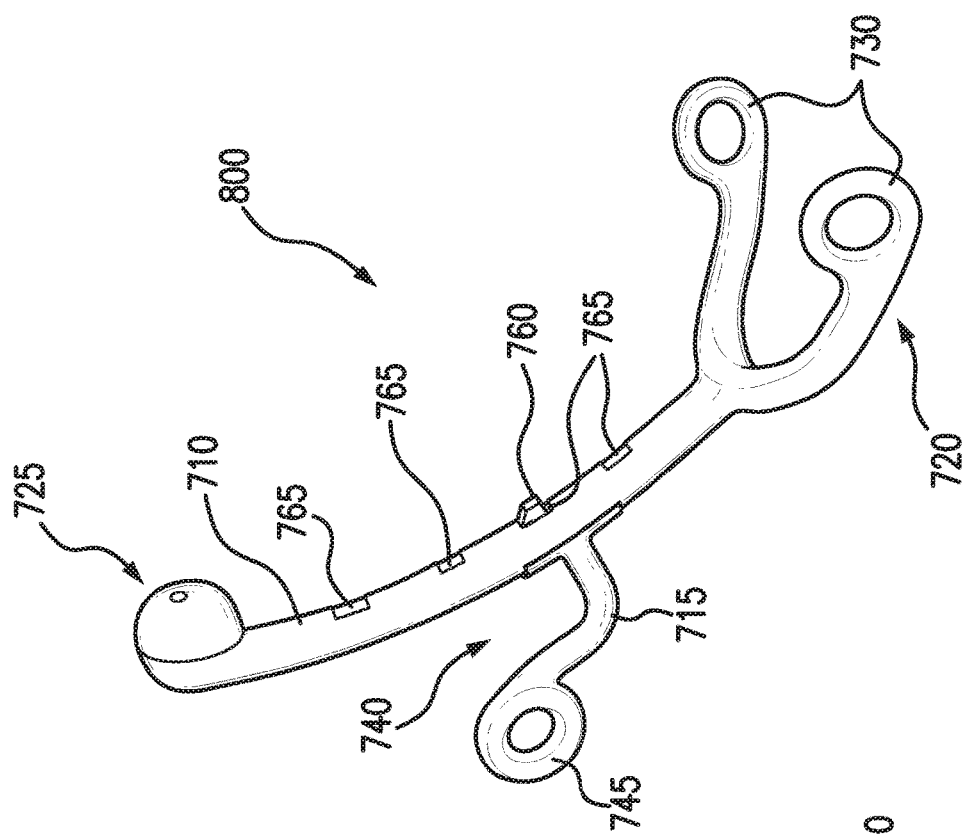
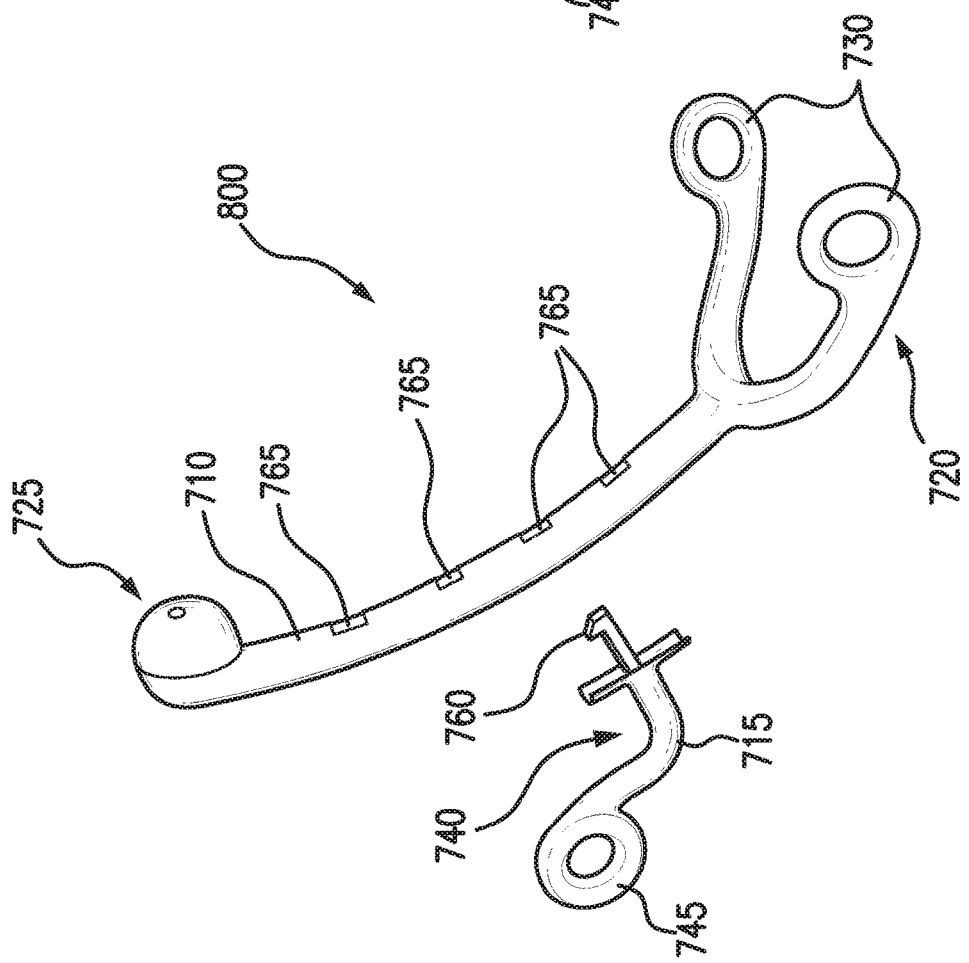
FIG. 8B
FIG. 8A

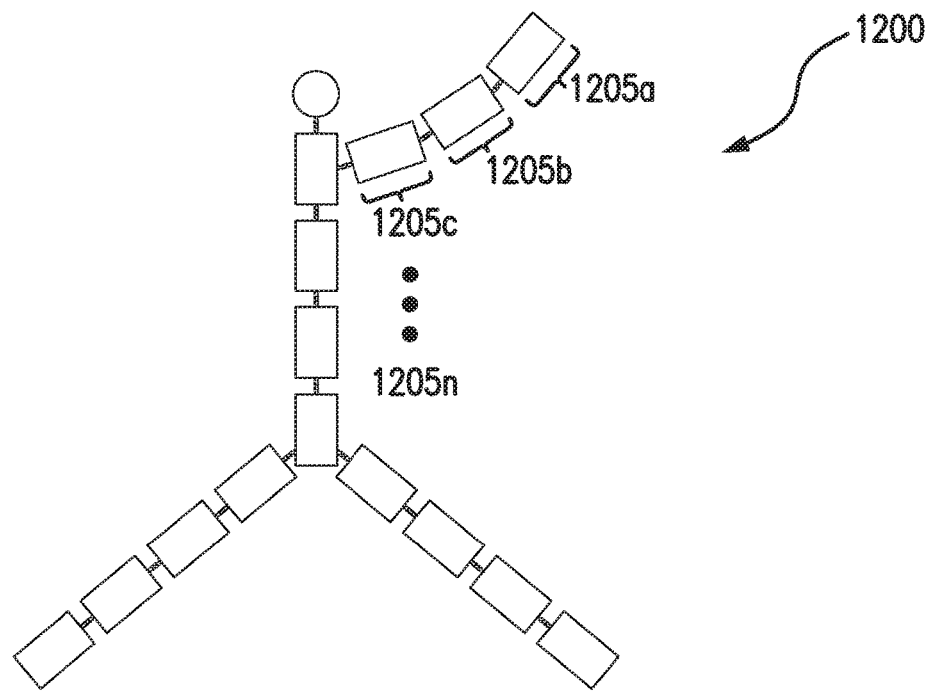
FIG. 12A
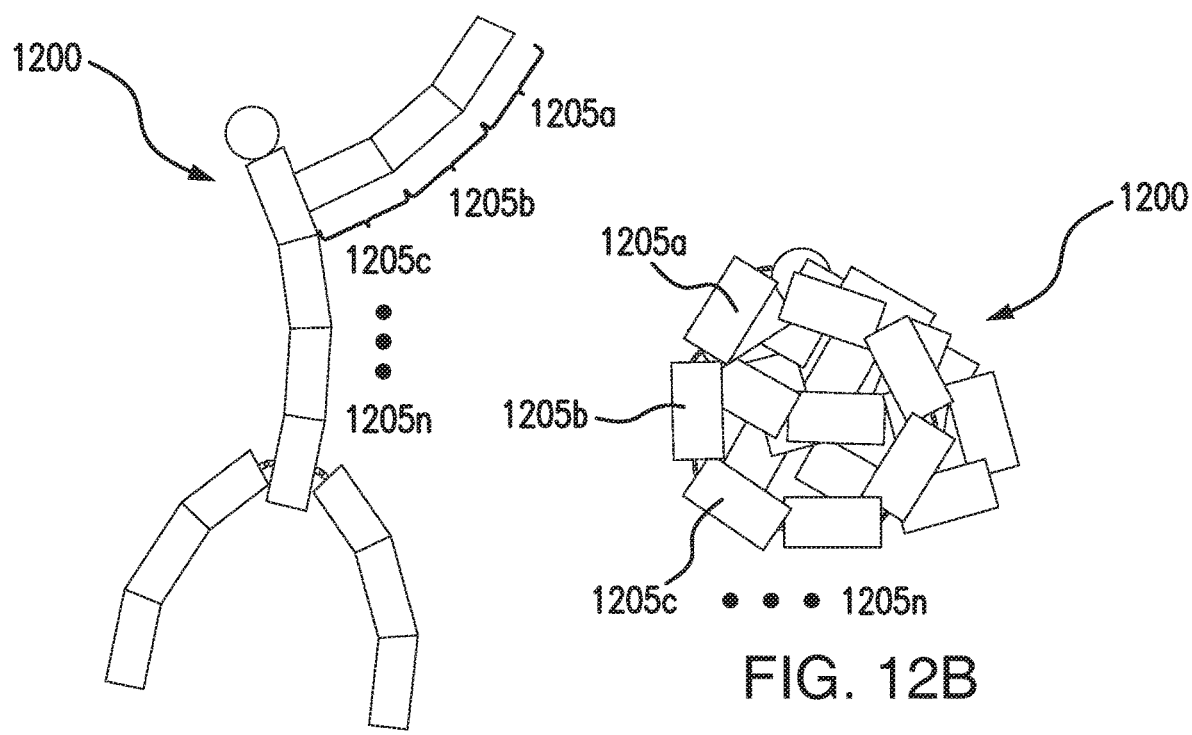
FIG. 12B
FIG. 12C

DEVICE AND METHOD FOR ADJUSTING THE POSITION OF EYEGLASSES ON THE FACE OF A USER

CROSS-REFERENCE

The present application claims the benefit of provisional patent application No. 62/624,153 entitled "DEVICE AND METHOD FOR ADJUSTING THE POSITION OF EYEGLASSES ON THE FACE OF A USER," filed on Jan. 31, 2018, the entire contents of which are expressly incorporated herein by reference.

FIELD OF INVENTION

The present invention relates to accessories for eyewear and, in particular, to a device and method for adjusting the position of multi-focal eyeglasses and spectacles on the face of a user.

BACKGROUND OF THE INVENTION

Many individuals worldwide wear eyeglasses or other forms of spectacles to correct for vision problems. In some instances, individuals may experience difficulty viewing objects at various distances as a result of presbyopia (a vision condition that affects the ability to focus on nearby objects) or other vision disorders, such as those impacting the accommodation reflex of the eyes. In such instances, individuals are often prescribed multifocal lenses, such as bifocals or trifocals, or in some cases progressive lenses (also referred to as graduated prescription lenses), which provide zones or gradients of increasing lens power from a distance prescription at the top of the lenses to a reading prescription at the bottom of the lenses. In this manner, the wearer of multifocal or progressive lenses may focus on objects at varying distances by simply peering through the correct area of the lenses.

Referring now to FIG. 1, there is seen a typical progressive or graduated lens 100. The progressive lens 100 includes three zones: a distance zone 105 for viewing objects at a distance, an intermediate zone 110 for closer objects and a near zone 115 typically used for reading or viewing objects immediately adjacent the viewer. The viewer will typically focus on objects better when peering through these zones 105, 110, 115 within a central corridor 120, along which the zone prescriptions are best aligned to ensure optimal viewing. Views within blending regions 125a, 125b outside central corridor 120 are typically distorted, due to astigmatic aberrations caused by the gradient of prescription power across zones 105, 110, 115 of lens 100.

In some instances, objects near the viewer may be positioned such that comfortable viewing occurs only through distance and/or intermediate zones 105, 110 of lens 100, thereby causing these objects to be distorted and/or out of focus when viewed. For instance, a computer monitor is often positioned at eye level and close to a viewer, such that normal viewing occurs through distance zone 105 of progressive lens 100. In such a case, images on the monitor may appear distorted and/or out of focus.

Referring now to FIG. 2, there is seen a diagram 200 illustrating this problem. As shown in the figure, object 205 (such as a computer screen) is positioned near viewer 210 wearing progressive lenses 215. In this position, best viewing will occur through intermediate zone 220 of lenses 215, and in some cases through near zone 225 (depending upon the distance of object 205 from viewer 210). However, as can be seen in the figure, most comfortable viewing of object 205 (i.e., when the neck of viewer 210 is substantially erect and held straight along vertical 230) occurs through the distance zone within an upper field of vision 235. When viewed in this manner, object 205 will appear distorted and out of focus. As shown in diagram 300 of FIG. 3, to correctly focus on object 205, viewer 210 is forced to tilt his/her neck upward at an uncomfortable angle 305, so that a line-of-sight to object 205 occurs through intermediate zone 220 of lenses 215, or through near zone 225 depending on the circumstances. This may result in poor posture, eye-strain, and neck and back pain.

One prior art solution to this problem involves repositioning objects to obviate the need to tilt the viewer's neck. For example, computer monitors may be positioned lower such that comfortable viewing occurs within the correct field of vision through the intermediate zone of progressive lenses (or through the near zone if positioned sufficiently close to the viewer). However, repositioning objects is not always practical or possible, and often times detracts from the viewing experience.

Another solution involves the use of specialized spectacles (such as computer spectacles) having a single, task-specific prescription or progressive lenses with larger near and/or intermediate zones for optimal focus of objects along the viewer's line of sight. However, this solution sacrifices distance and/or near viewing capabilities, thereby requiring the viewer to purchase and carry multiple spectacles having different prescriptions. This reduces convenience and increases cost.

Still another solution contemplates the use of modified frames with mechanisms that permit the spectacles to slide vertically into different positions with respect to the viewer's line of sight. This solution too is costly, requiring the user to either maintain multiple sets of spectacles or sacrifice style for specialization.

Yet another solution contemplates one or more surgical procedures to correct abnormalities of the eyes. These solutions, however, are costly and often times temporary, with any improvements to vision potentially diminishing over time. Other high-tech solutions, such as "Google Glasses" may eventually become available, but will again require an extra, and presumably high priced accessory.

SUMMARY OF THE INVENTION

Embodiments of the present invention solve these and other issues by providing a device that is structured and operable to raise the position of common eyeglasses or spectacles (referred to collectively throughout as "eyeglasses") on a user's face, thereby ensuring that nearby objects are viewed comfortably through the proper zone of multifocal or progressive lenses. Embodiments of the device are intended for daily use and can be affixed to eyeglasses only when needed.

In one embodiment, the device comprises a body with proximal and distal ends. The proximal end is structured to rest on the bridge of a person's nose and the distal end is structured to engage with the frame, e.g., the bridge, of a pair of eyeglasses. When used, the device supports the eyeglasses in a raised position and is kept in place via friction and the weight of the spectacles. In another embodiment, in lieu of or in addition to raising the eyeglasses, the device is provided with a structural feature, such as a bow or suitably constructed frame engaging member, that positions the eyeglasses further from the face of the person. In yet another embodiment, the device is made collapsible for easy storage and transportation.

In another embodiment, the device comprises first and second bodies designed to slideably and frictionally engage with one another, thereby allowing the length of the device to be selectively adjusted for comfortable viewing. In still another embodiment, notches are provided on the first and/or second bodies to permit the device to be adjusted to one of multiple discrete lengths. In yet another embodiment, the first or second body is provided with a peg structured to be inserted and rigidly snapped into receptacles of the other body to adjust the device to a desired length.

In still another embodiment, a device for adjusting a position of eyeglasses on a face of a user is provided. The device includes a body having proximal and distal ends, the body being provided with a pronounced bow; at least one nose engaging member provided on the proximal end of the body, the nose engaging member being structured to engage with a bridge of a nose of the user; and at least one frame engaging member provided on the distal end of the body, the frame engaging member being structured to engage with the frame of the eyeglasses, wherein the pronounced bow of the body is structured to adjust a horizontal position of the eyeglasses with respect to the face of the user.

BRIEF DESCRIPTION OF THE DRAWINGS

FIG. 8a is an illustration showing two bodies of a device according to the present invention in a disconnected configuration.

FIG. 8b is an illustration showing two bodies of a device according to the present invention in a connected configuration.

FIG. 12a is an illustration of a device according to the present invention having collapsible segments.

FIG. 12b is an illustration of a device according to the present invention having collapsible segments in a collapsed configuration.

FIG. 12c is an illustration of a device according to the present invention having collapsible segments in a tightened configuration.

DETAILED DESCRIPTION

Figure 1:
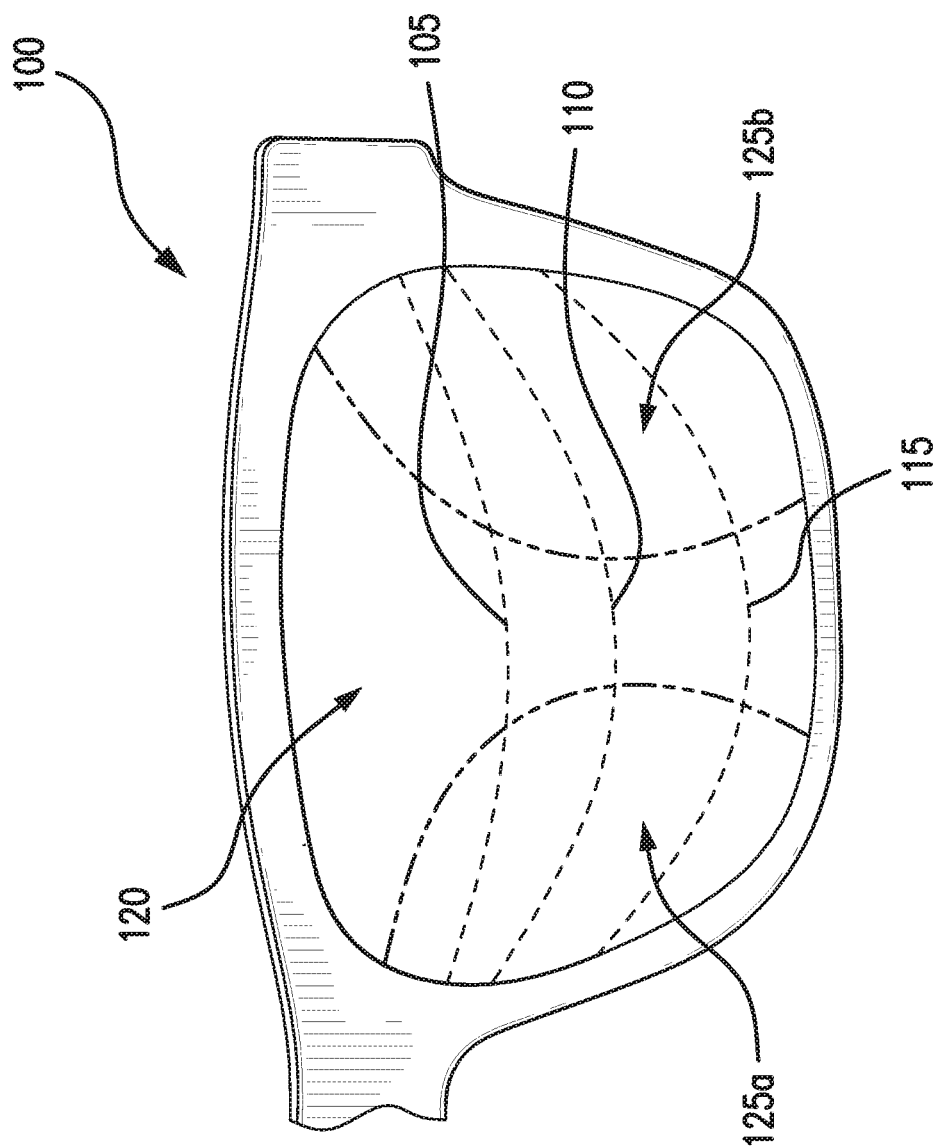
FIG. 1 is an illustration of a typical progressive or graduated lens.
Figure 2:
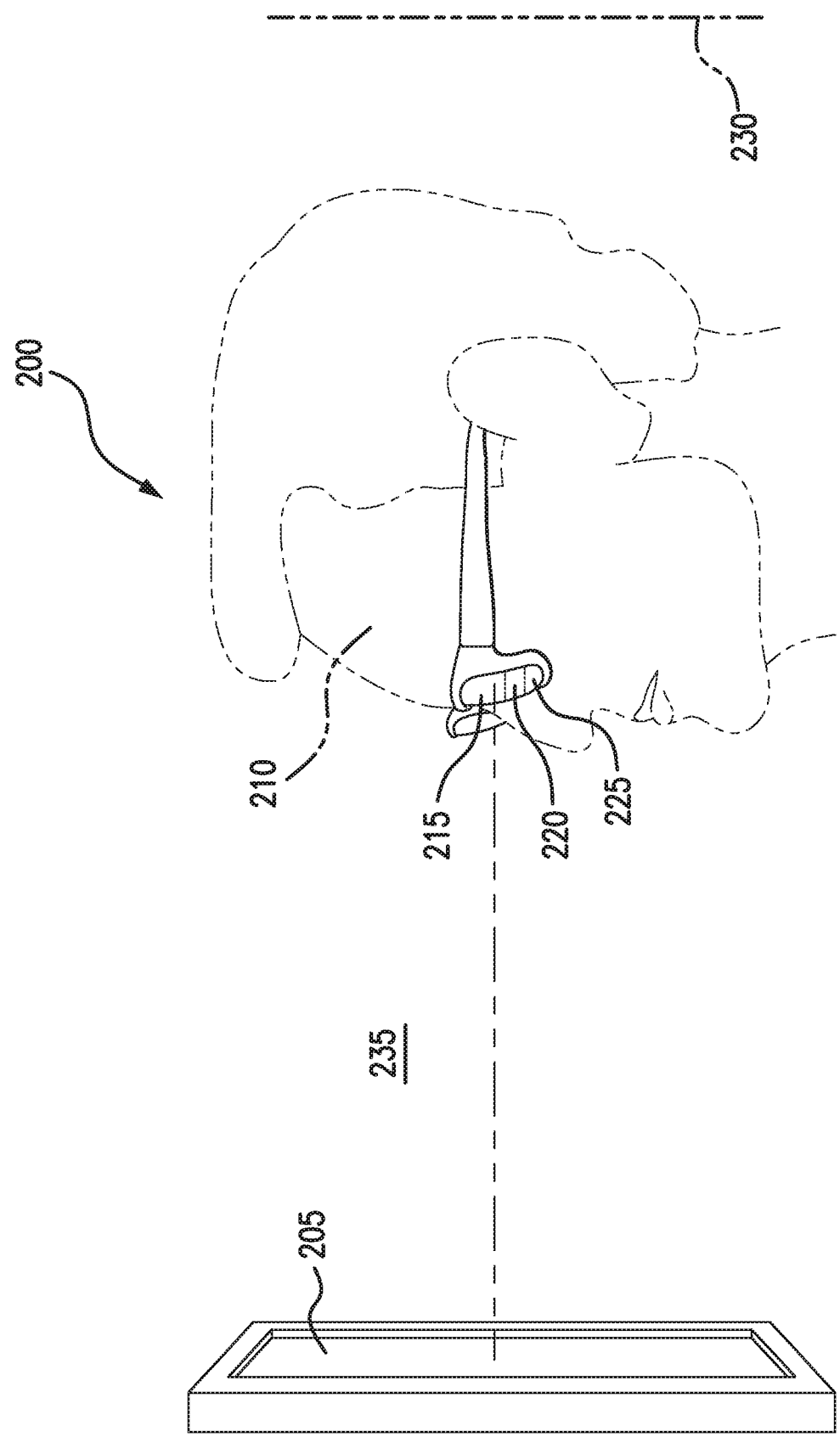
FIG. 2 is a diagram illustrating a focusing issue associated with multifocal or progressive lenses.
Figure 3:
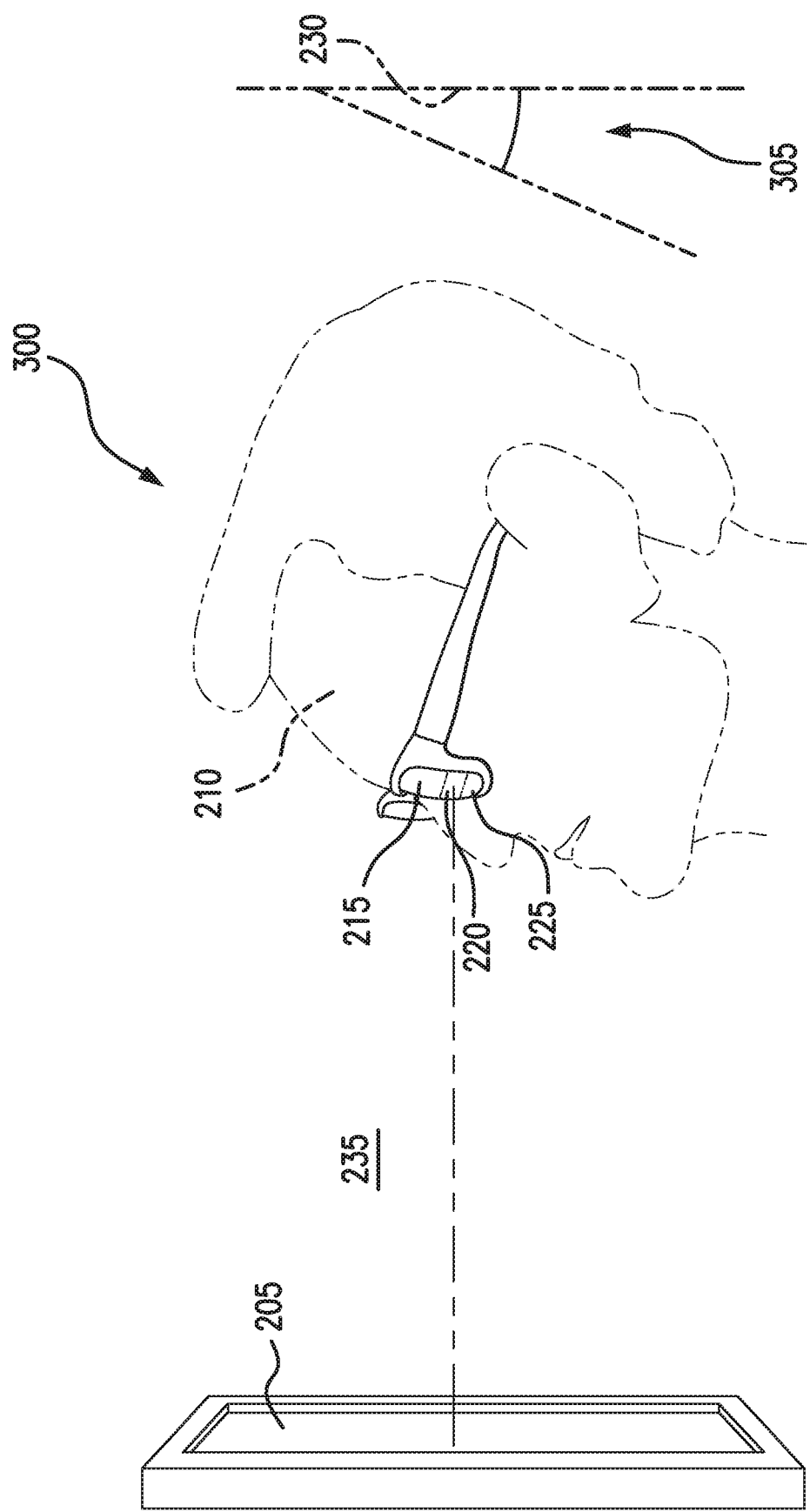
FIG. 3 is a diagram illustrating a disadvantageous correction of a focusing issue associated with multifocal or progressive lenses.
Figure 4:
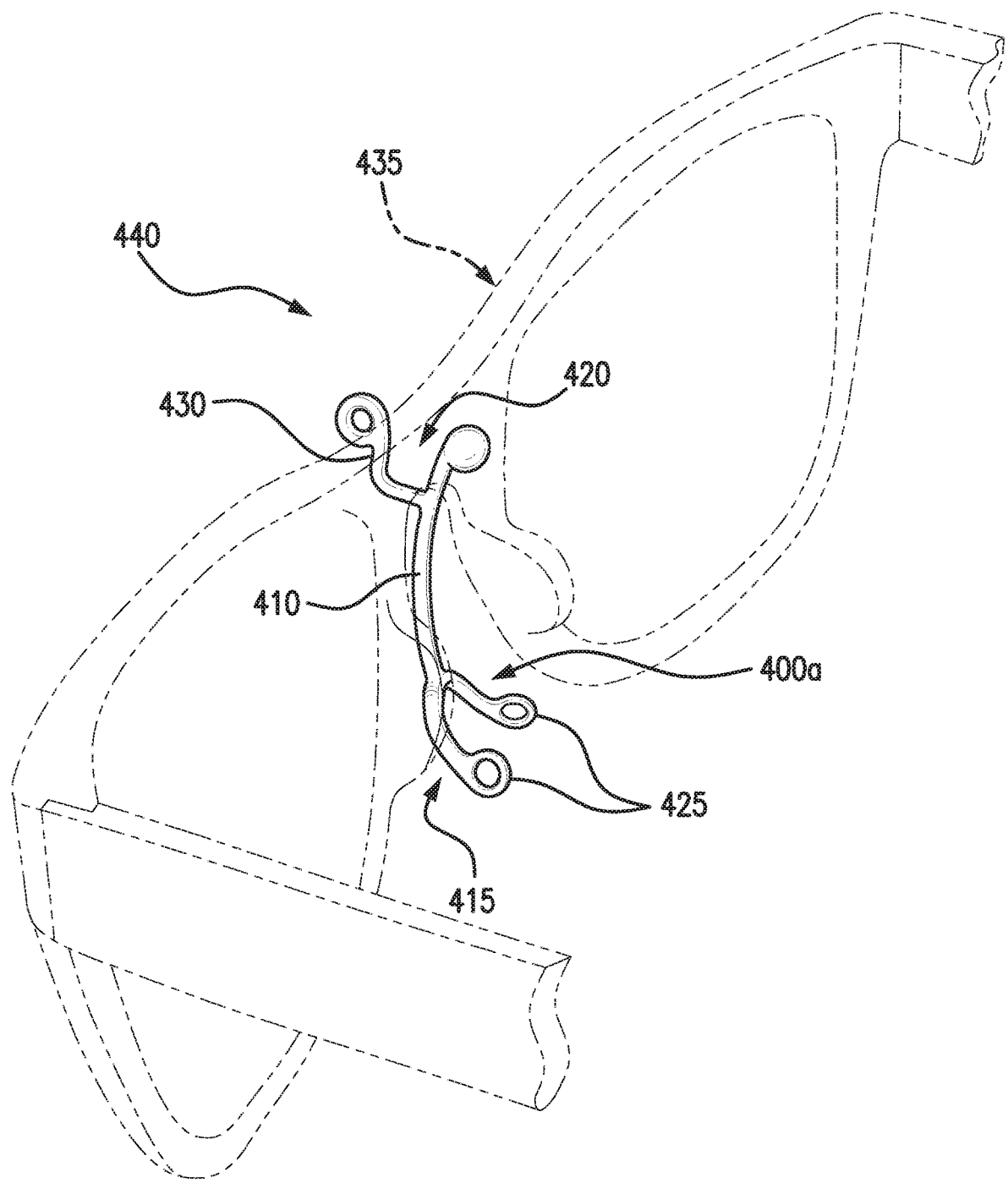
FIG. 4 is an illustration of a device according to the present invention.

Referring now to FIG. 4, there is seen a device 400a in accordance with an embodiment of the present invention. Device 400a includes body 410 having proximal and distal ends 415, 420. Proximal end 415 is provided with one or more nose engaging members 425 structured to engage with the bridge of a user's nose. Nose engaging members 425 may be shaped to gently straddle the user's nose bridge and may include nose pads (not shown) or other structures for more comfortable wearing.

Figure 5A:
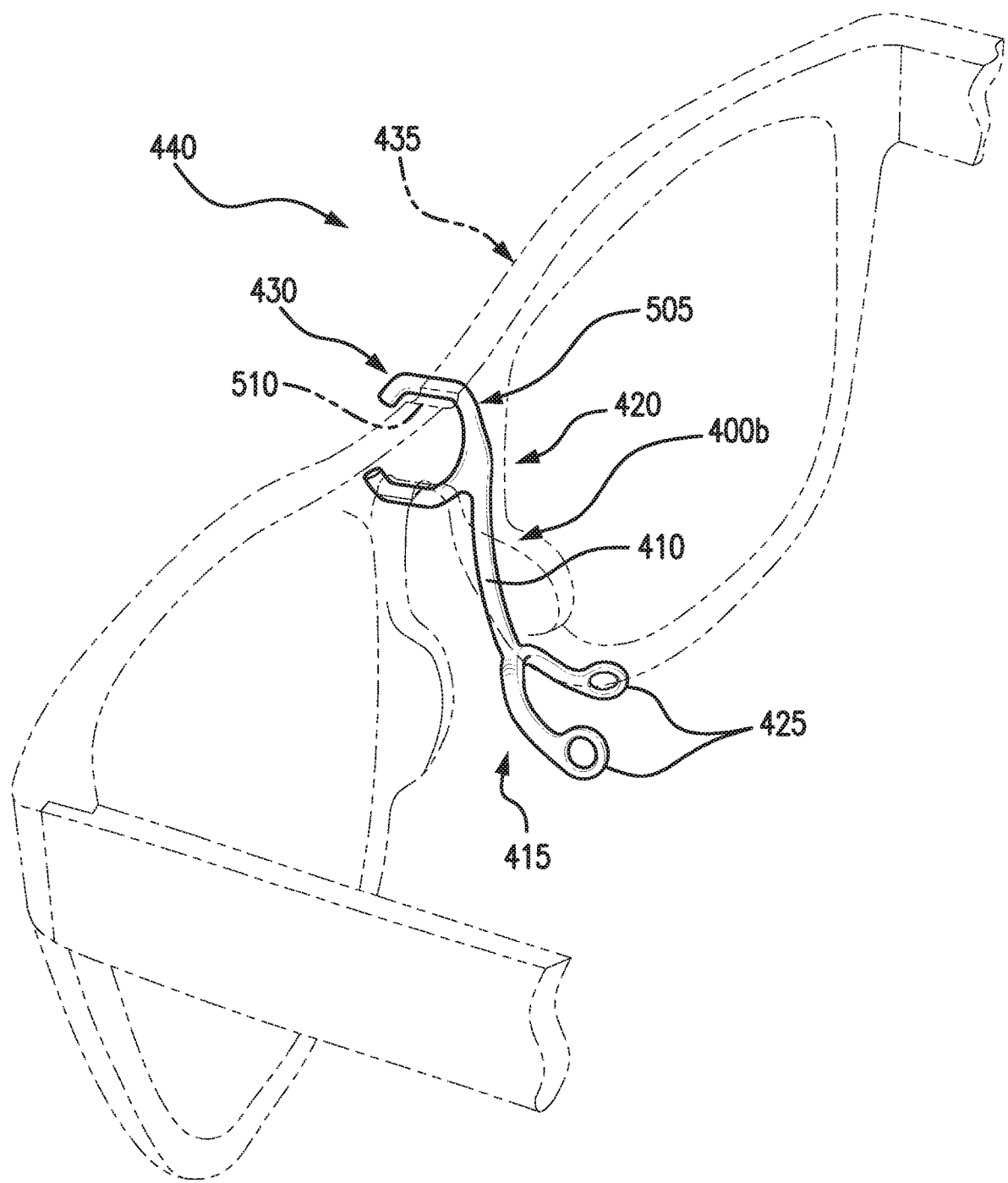
FIG. 5a is an illustration of another device according to the present invention.
Figure 5B:
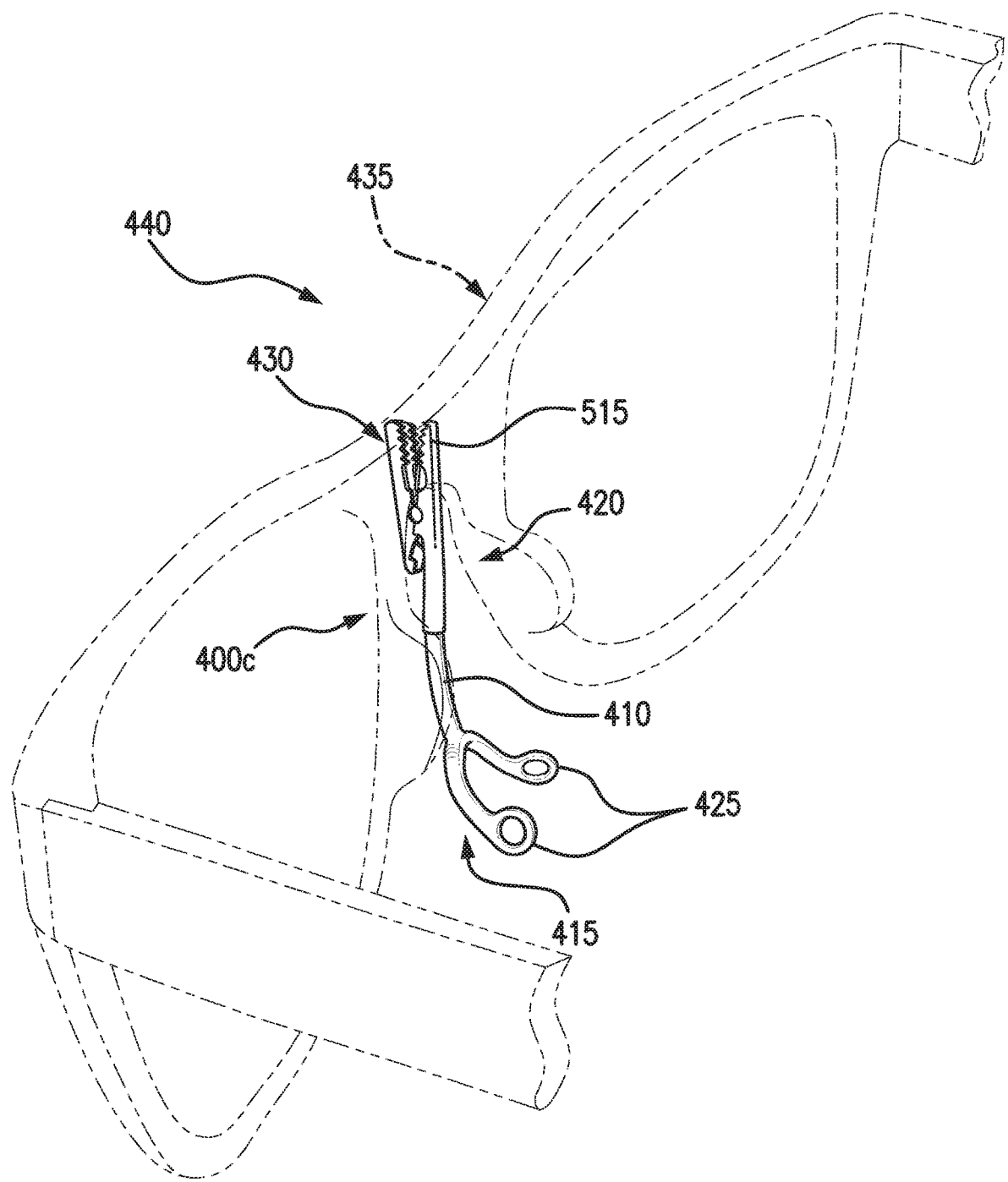
FIG. 5b is an illustration of still another device according to the present invention.
Figure 5C:
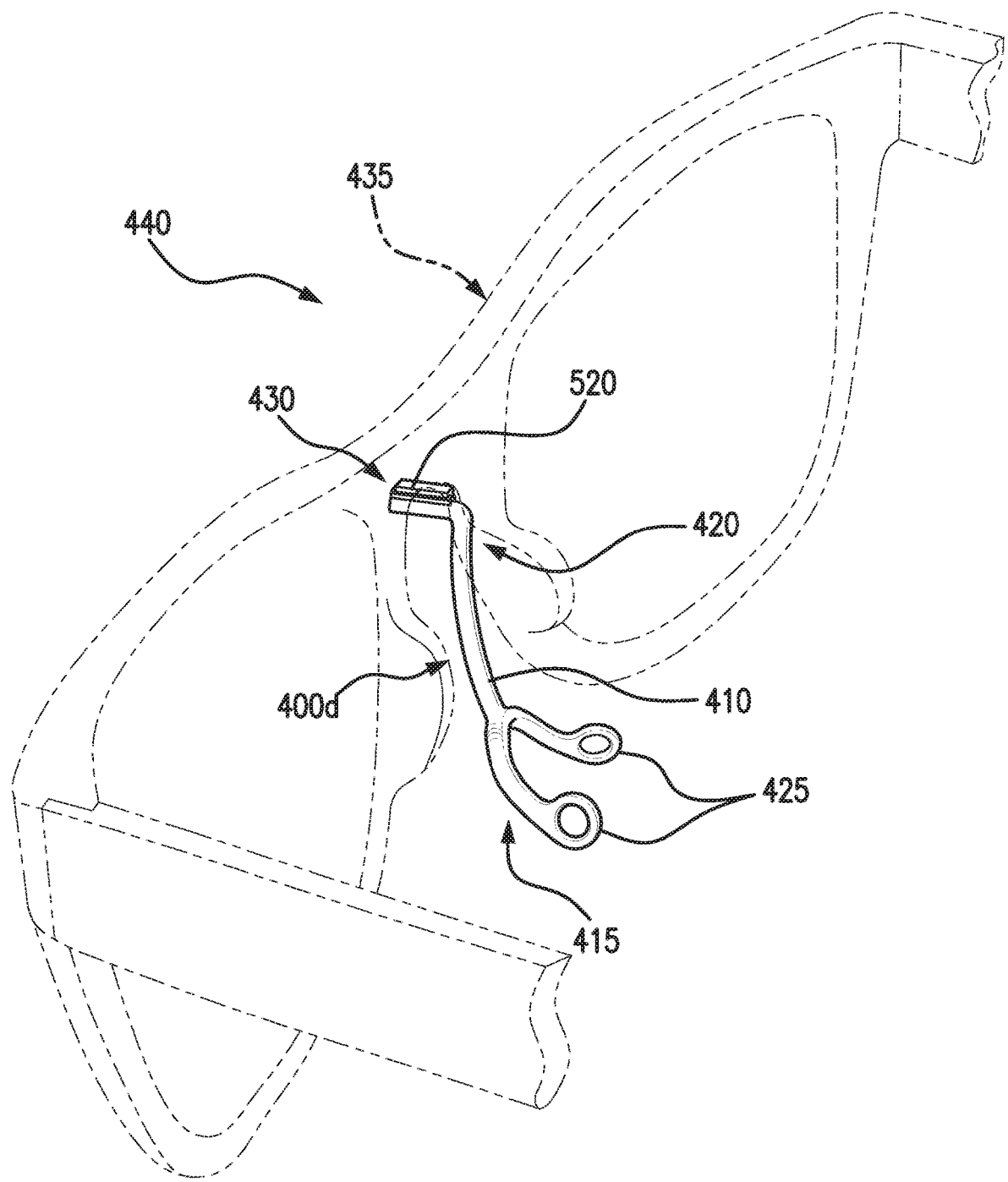
FIG. 5c is an illustration of yet another device according to the present invention.

Distal end 420 is provided with one or more frame engaging members 430 structured to engage with a frame 435, e.g., the bridge, of eyeglasses 440, including rimmed or rimless eyeglasses 440. Frame engaging members 430 may be shaped to ensure that device 400a may be easily attached to various types of eyeglasses 440, detached and stored when not being used. In the embodiment shown in FIG. 5a, for example, a device 400b is provided with a snap connector 505 for engaging with a suitably designed mating groove 510 on frame 435 of eyeglasses 440. In another embodiment shown in FIG. 5b, a device 400c is provided with a clip 515 or other attachment mechanism (such as an alligator clip-like mechanism 515) for clipping onto the bridge of frame 435. In still another embodiment, frame engaging members 430 include a special structure designed to couple with related structures of eyeglass frames. For example, device 400d shown in FIG. 5c is provided with a magnetic element 520 operable to magnetically couple to a second magnetic element (not shown) attached to or part of frame 435 of eyeglasses 440. Of course, a person of ordinary skill in the art would recognize various manners by which devices 400a, 400b, 400c, 400d could be coupled to eyeglasses, and the present invention as a whole is not intended to be limited by or to any specific coupling mechanism.

Devices 400a, 400b, 400c, 400d may be of any suitable length (e.g., less than two inches long) and may be constructed as a unitary piece or from multiple pieces, and may be manufactured (such as via casting or 3D printing) or handcrafted from any material(s) of sufficient strength and stiffness to enable devices 400a, 400b, 400c, 400d to suspend eyeglasses 440 from the bridge of a user's nose, such as metal (e.g., titanium, precious metals), silicone, plastic, resin, composites, rigid 3D printed materials, non-corrosive materials, stiff hypoallergenic materials, etc. The design and materials of devices 400a, 400b, 400c, 400d may also be selected to ensure that devices 400a, 400b, 400c, 400d are not excessively heavy or appear too clunky, for example, by constructing devices 400a, 400b, 400c, 400d from lightweight titanium wire. At least nose and frame engaging members 425, 430 (and in other embodiments body 410 as well) may also be made from malleable materials to permit devices 400a, 400b, 400c, 400d to conform to different nose shapes and to accommodate different types of frame designs, such as when devices 400*a*, 400*b*, 400*c*, 400*d* are intended to be worn by more than one user, or when a user has more than one pair of eyeglasses.

In another embodiment of the present invention, devices 400*a*, 400*b*, 400*c*, 400*d* are made available in several standard sizes, such as tall, medium, petite, wide width, etc. Devices 400*a*, 400*b*, 400*c*, 400*d* may also be made available in more highly customized "bespoke" versions that are specially tailored to a particular individual based on one or more of his/her face shape, nose bridge height, bridge width, lens prescription, eyeglass shape, etc. Decorated, designer or high fashion versions of devices 400*a*, 400*b*, 400*c*, 400*d* may also be made available.

Figure 6:
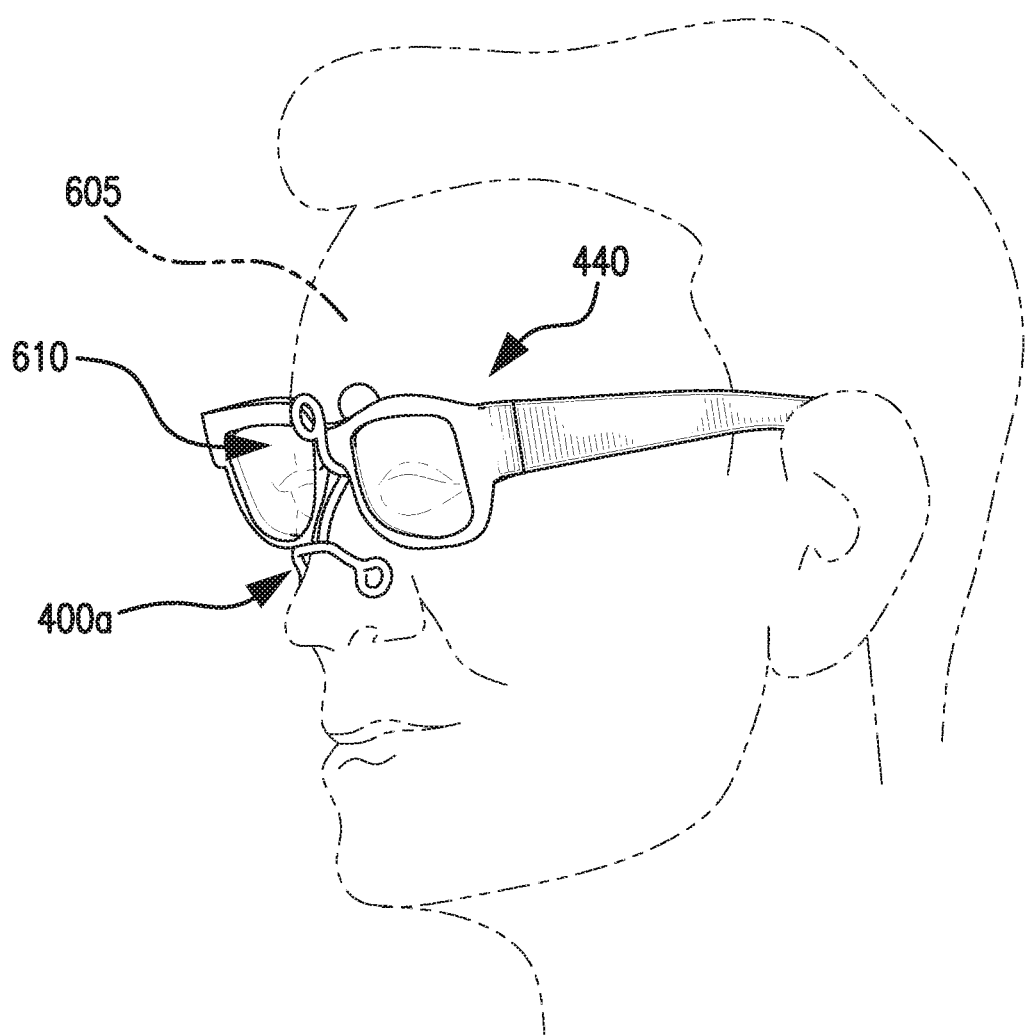
FIG. 6 is an illustration showing a user wearing a device according to the present invention.

Referring now to FIG. 6, there is seen device 400*a* in use by viewer 605 to raise a pair of eyeglasses 440 with progressive lenses 610 into a position higher on the face of viewer 605, thereby ensuring that his/her straight line of sight in a selected head position, such as a substantially erect neck position, extends through the intermediate and/or near zones of progressive lenses 610. This ensures that viewer 605 can peer directly ahead to see nearby items clearly in the intermediate and/or near zones of progressive lenses 610 without the need for viewer 605 to tilt his/her neck into an uncomfortable position.

Figure 7:
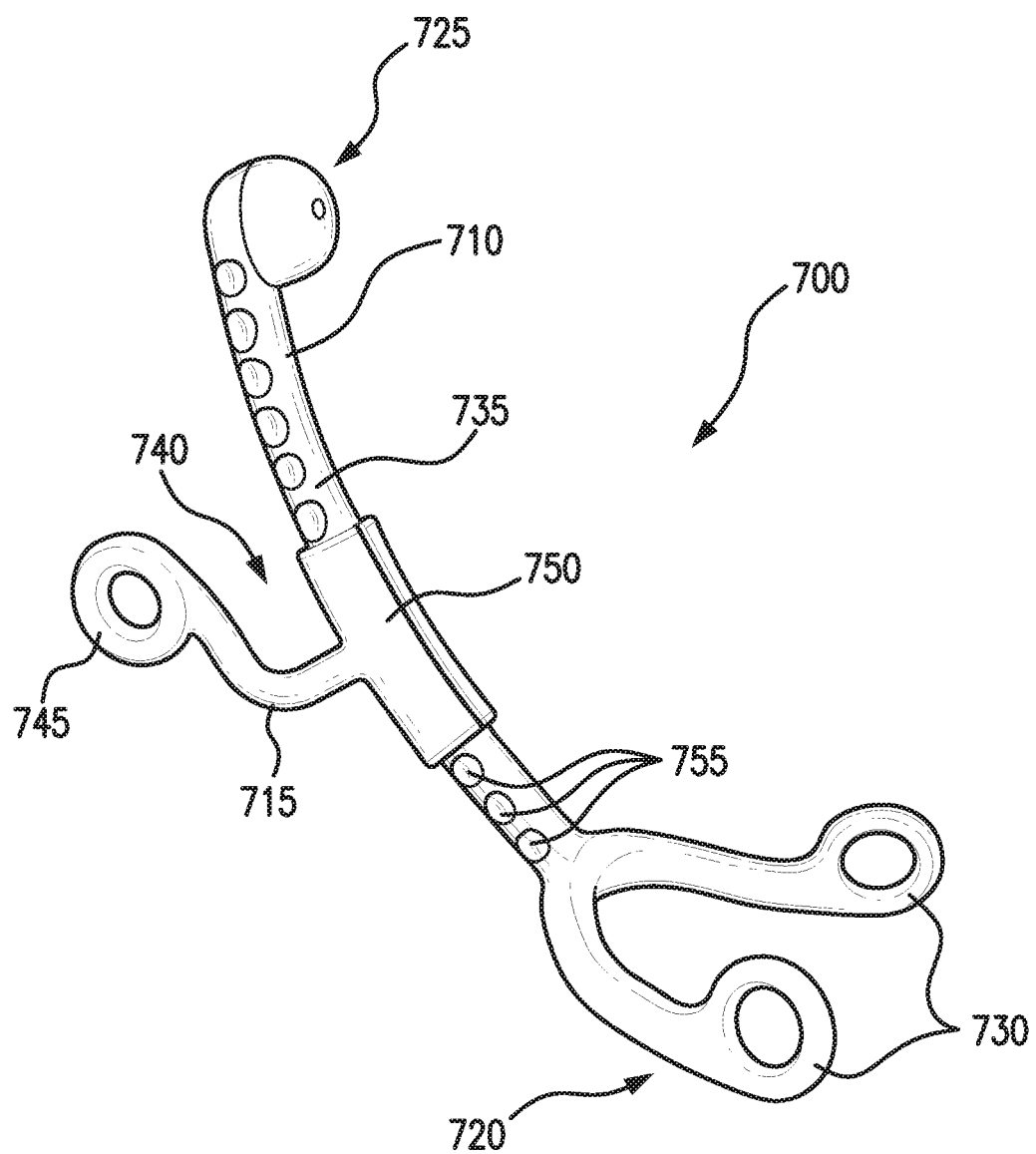
FIG. 7 is an illustration of still another device according to the present invention.

Referring now to FIG. 7, there is seen a device 700 according to the present invention. Device 700 includes first and second bodies 710, 715. First body 710 includes proximal and distal ends 720, 725. Proximal end 720 is provided with one or more nose engaging members 730 structured to engage with the bridge of a user's nose, and distal end 725 is provided with a mating portion 735. Second body 715 includes a distal end 740 provided with one or more frame engaging members 745 structured to engage with the frame of a pair of eyeglasses. Second body 715 also includes mating portion 750 structured to frictionally and slideably engage with mating portion 735 of first body 710. One or both of first and second bodies 710, 715 may be provided with notches 755 or other means that permit device 700 to be adjusted to various desired, discrete lengths. In this manner, bodies 710, 715 permit device 700 to be adjusted in a telescoping fashion to a desired length that is comfortable and appropriate for viewing one or more particular objects. To facilitate the adjustment, frame engaging members 745 may be provided with or formed into an ergonomic handle (such as the looped handle shown in FIG. 7), which may be gripped by a user for easy adjustment of device 700. In other embodiments, such as device 800 shown in FIGS. 8*a* and 8*b*, body 715 is provided with a peg 760 structured to be inserted and rigidly snapped into one of a series of receptacles 765 to adjust device 800 to a desired length. Of course, one of ordinary skill in the art would recognize that any mechanism may be employed for adjusting the positions of bodies 710, 715 with respect to one another, and that the present invention as a whole is not intended to be limited by or to any particular adjusting mechanism. It should also be appreciated that devices 700, 800 may be fitted with snap connector 505, clip 515 and/or magnetic element 520 (such as shown in FIGS. 5*a* through 5*c*) to ensure that devices 700, 800 may be easily attached to various types of eyeglasses 440.

Similar to devices 400*a*, 400*b*, 400*c*, 400*d*, devices 700, 800, and particularly first and second bodies 710, 715, may be of any suitable length and each may be constructed as a unitary piece or from multiple pieces. Devices 700, 800 may also be manufactured (such as via casting or 3D printing) or handcrafted from any material(s) of sufficient strength and stiffness to enable devices 700, 800 to suspend eyeglasses 440 from the bridge of a user's nose, such as metal (e.g., titanium, precious metals), silicone, plastic, resin, composites, rigid 3D printed materials, non-corrosive materials, stiff hypoallergenic materials, etc. The design and materials of devices 700, 800 may also be selected to ensure that devices 700, 800 are not excessively heavy or appear too clunky, for example, by constructing devices 700, 800 from lightweight titanium wire. At least nose and frame engaging members 730, 745 (and in some embodiments, bodies 710 and/or 715 as well) may also be made from malleable materials to permit devices 700, 800 to conform to different nose shapes and to accommodate different types of frame designs, such as when devices 700, 800 are intended to be worn by more than one user, or when a user has more than one pair of eyeglasses.

In yet another embodiment of the present invention, devices 700, 800 may each be made available as a single "one size fits all" design, or may come in several standard sizes (each adjustable to a different maximum length), such as tall, medium, petite, wide width, etc. Devices 700, 800 may also be made available in more highly customized "bespoke" versions that are specially tailored to a particular individual based on one or more of his/her face shape, nose bridge height, bridge width, lens prescription, eyeglass shape, etc. Decorated, designer or high fashion versions of devices 700, 800 may also be made available.

Figure 9:
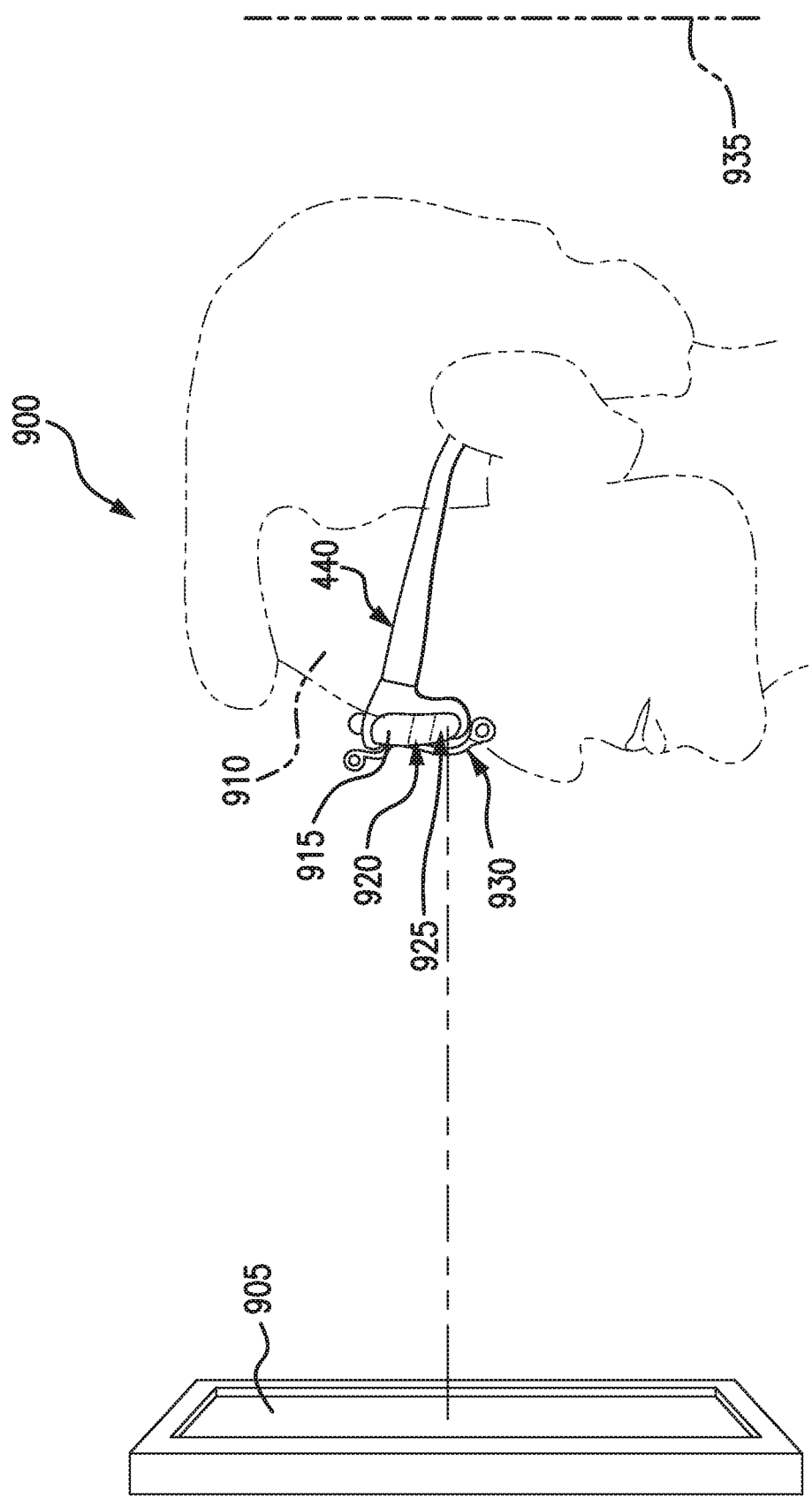
FIG. 9 is a diagram illustrating how devices according to the present invention correct for a focusing issue associated with multifocal or progressive lenses.

Referring now to FIG. 9, there is seen a diagram 900 detailing the corrective properties of devices 400*a*, 400*b*, 400*c*, 400*d*, 700, 800. As shown in the figure, object 905 is positioned near viewer 910 wearing eyeglasses 440 with progressive lenses 915. In this position, best viewing will occur through intermediate zone 920 of lenses 915, or through near zone 925 depending on the circumstances. Devices 400*a*, 400*b*, 400*c*, 400*d*, 700, 800 (referred to collectively in FIG. 9 with reference numeral "930") individually raise the position of eyeglasses 440 together with lenses 915, thereby better ensuring an optimal viewing position without the need for viewer 910 to tilt his/her head with respect to vertical 935.

In addition to raising the position of eyeglasses 440, embodiments of the present invention provide other manners by which nearby objects may be viewed comfortably through a proper zone of multifocal or progressive lenses. For instance, in addition to or in lieu of raising eyeglasses 440 vertically, eyeglasses 440 may be advantageously positioned further horizontally from the face of viewer 605, 910 to achieve similar results. As eyeglasses 440 are moved horizontally away from viewer 605, 910, the focal point of the lenses is brought closer to the retinas of the eyes. As such, the amount of vertical adjustment (or angular displacement of eyeglasses 440) needed to view through the intermediate and near zones of the lenses is decreased. In this way, horizontal translation of eyeglasses 440 results in improved near vision correction by reducing the need for substantial head tilt (and accompanying neck strain), even in the absence of vertical lens displacement, and without a change in absolute lens refraction. To the extent vertical displacement of eyeglasses 440 is necessary or would result in improved viewing, the required amount of such vertical displacement would be minimized by the horizontal displacement (and vice-versa, as increasing vertical displacement would eliminate or reduce an amount of necessary horizontal displacement). However, it should be appreciated that either horizontal or vertical displacement alone would result in improved viewing, and that various claimed embodiments of the present invention are not intended to require both.

Figure 10A:
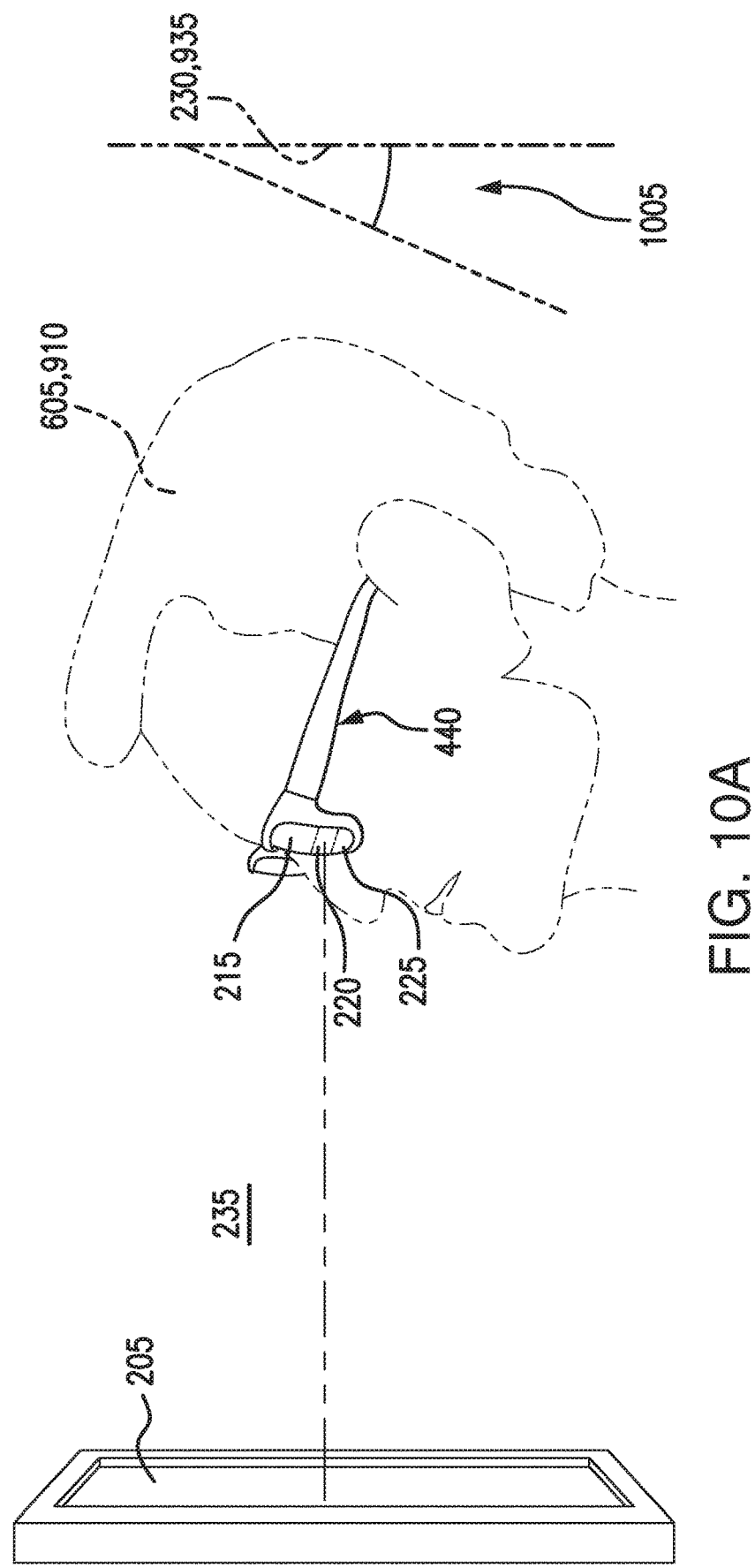
FIG. 10a is an illustration showing an angle for viewing an object when eyeglasses are positioned near a viewer's face.
Figure 10B:
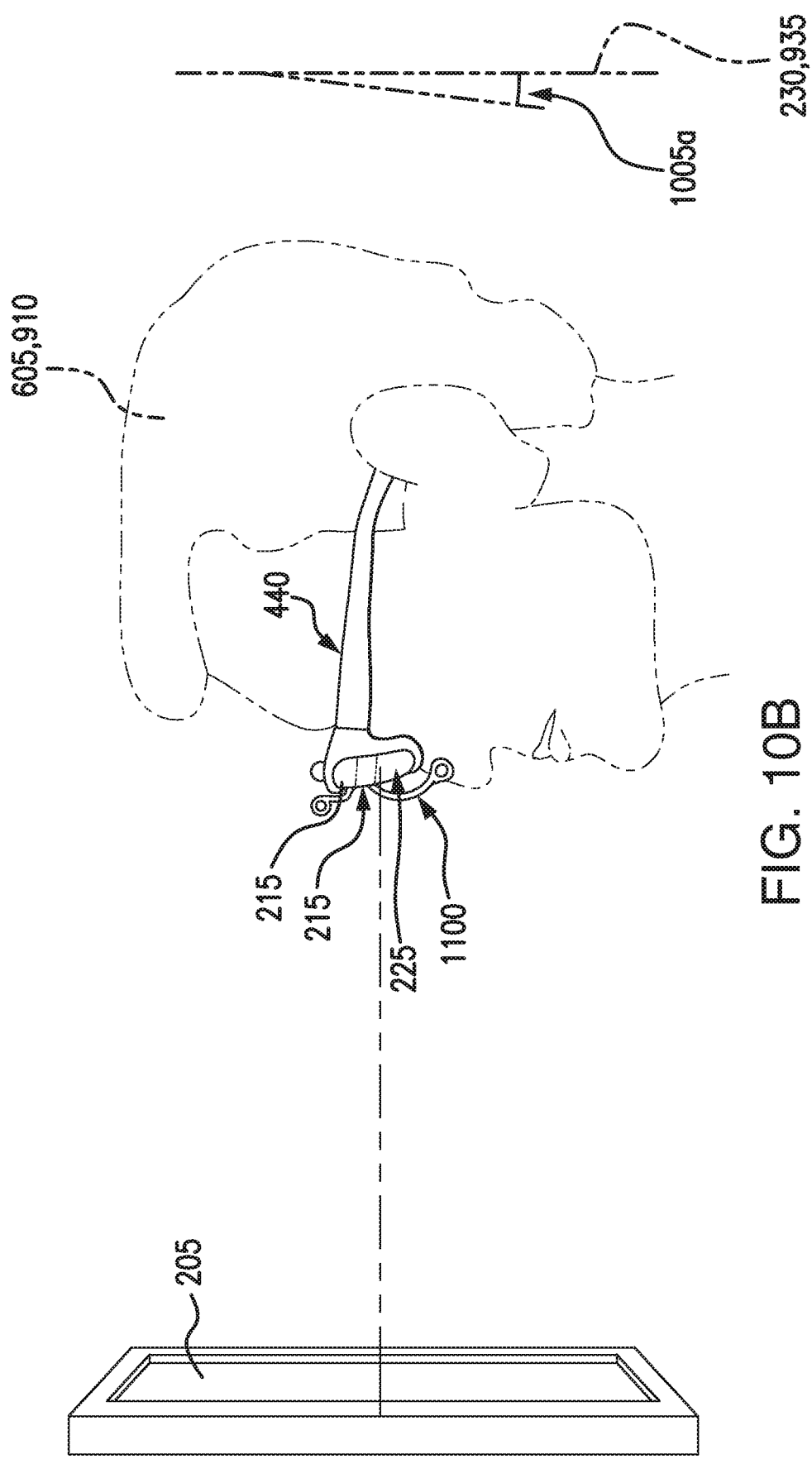
FIG. 10b is an illustration showing an angle for viewing an object when eyeglasses are positioned further from a viewer's face with no vertical change in position.
Figure 14:
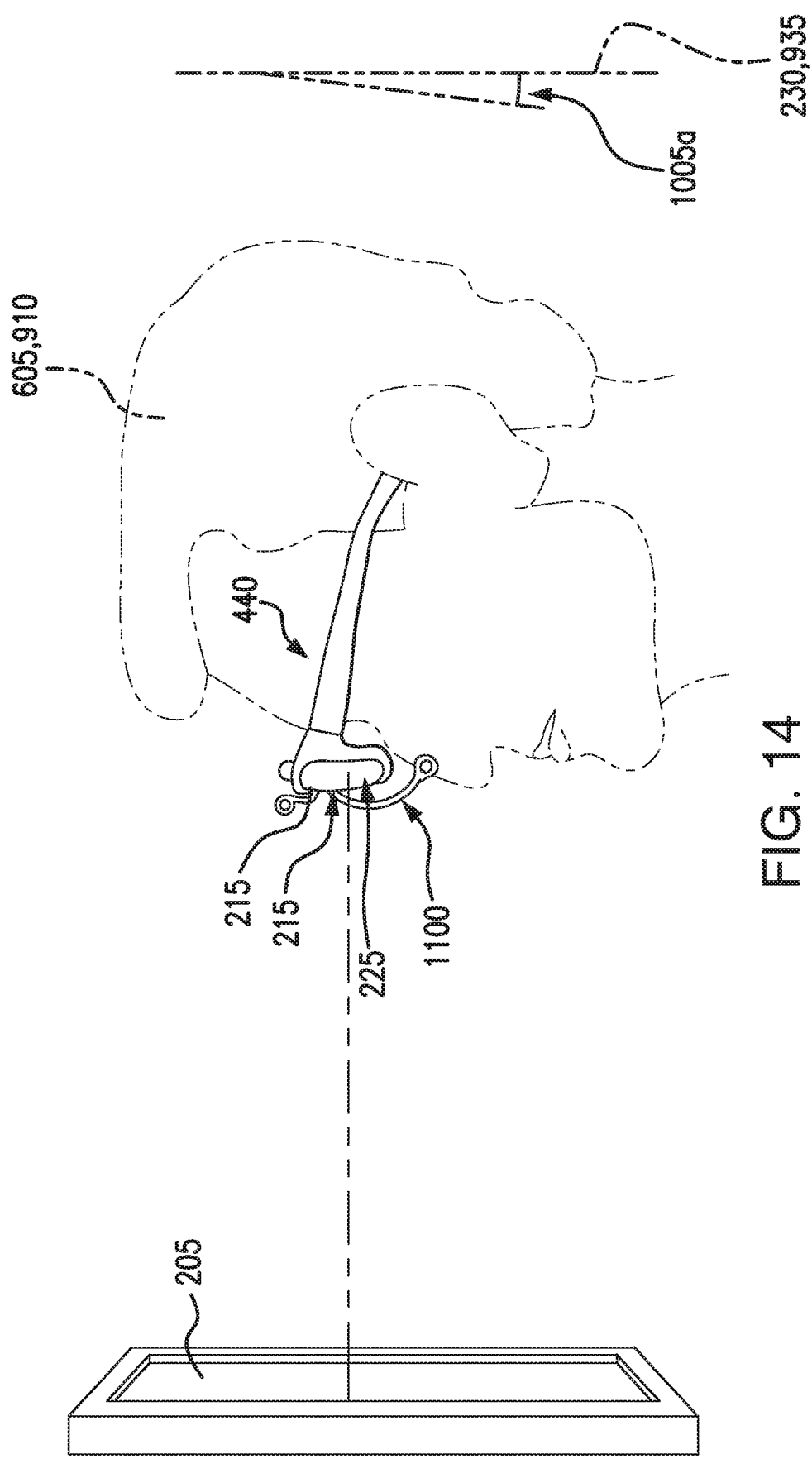
FIG. 14 is an illustration showing an angle for viewing an object when eyeglasses are positioned further from a viewer's face with a vertical change in position.

As can be seen in FIGS. 10a and 10b, for example, when eyeglasses 440 are positioned further from the face of viewer 605, 910 (as shown in FIG. 10b compared to the closer positioning shown in FIG. 10a), a viewing angle 1005 for viewing object 205 decreases (or is eliminated), thereby requiring less head tilt to view object 205 through lower-positioned prescription zones of eyeglasses 440. FIG. 14 illustrates yet another embodiment in which device 1100 positions eyeglasses both horizontally away from the face of viewer 605, 910 and vertically.

Figure 11:
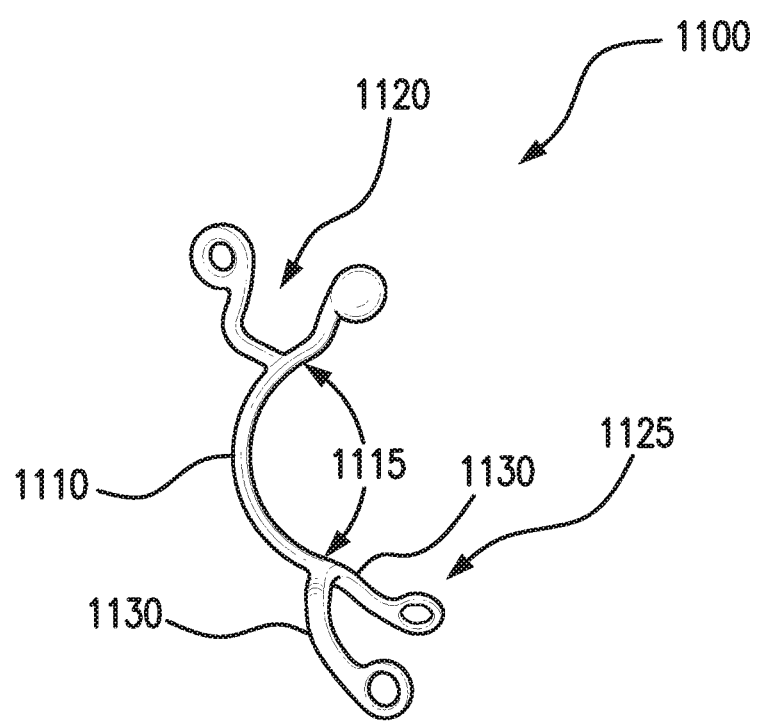
FIG. 11 is an illustration of another device according to the present invention.
Figure 13A:
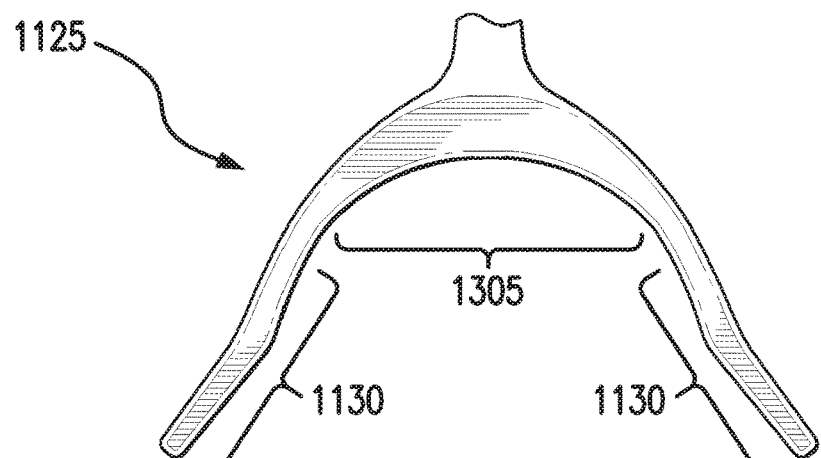
FIG. 13a illustrates a nose engaging member according to the present invention.
Figure 13B:
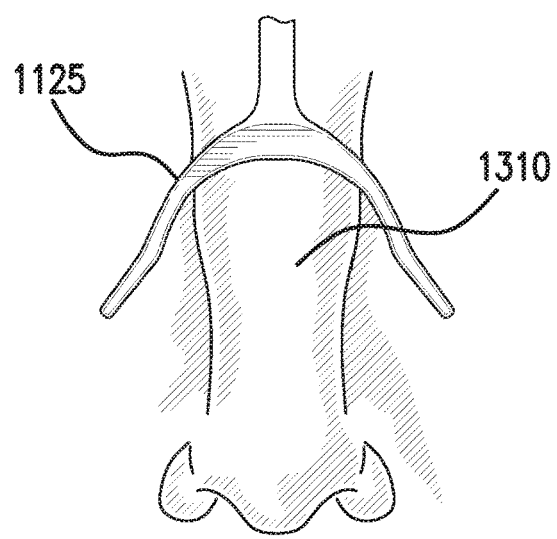
FIGS. 13b and 13C illustrate the nose engaging member of FIG. 13a positioned on different sized noses, respectively.
Figure 13C:
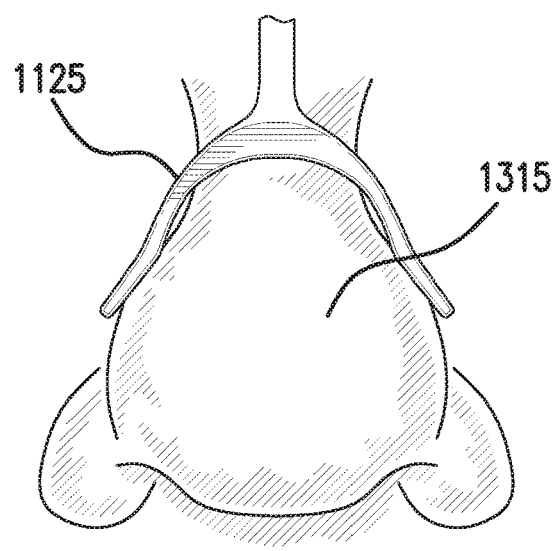

To position eyeglasses 440 further from the face of viewer 605, 910, devices according to the present invention may be provided with a bow or other structural feature that causes such devices to position eyeglasses 440 further from the face of viewer 605, 910 horizontally. Referring now to FIG. 11, for example, there is seen an exemplary device 1100 in accordance with an embodiment of the present invention. Device 1100 has features similar to those of device 400a of FIG. 4, except that a body 1110 of device 1100 is provided with a more pronounced bow 1115 for positioning eyeglasses 440 further from the face of viewer 605, 910. With respect to embodiments constructed from malleable materials, for example, bow 1115 may be made more or less pronounced by manual manipulation, thereby providing an ability to adjust the amount of horizontal displacement of eyeglasses 440. In another embodiment (not shown), in addition to or in lieu of bow 1115, the frame engaging member 1120 for mating device 1100 to the frame of eyeglasses 440 may be constructed to position eyeglasses 440 further from the face of viewer 605, 910. As shown in FIG. 13a through 13c, nose engaging member 1125 of device 1100 (and/or the nose engagement members of any other embodiments described herein or contemplated by the present invention) may be provided with a narrow apex 1305 for grasping narrow noses, such as nose 1310 in FIG. 13b, and may also include legs 1130 that flare outwardly for engaging with wider noses or wider areas of a nose, such as nose 1315 shown in FIG. 13c.

Of course, it will be appreciated that similar features (such as a bow or suitably constructed frame engaging member 1120, or other structural feature(s) for achieving a similar result) may be provided to any embodiment previously described herein, including devices 400b, 400c, 400d, 700, 800 as well as other embodiments not expressly described herein.

In another embodiment, devices 400a, 400b, 400c, 400d, 700, 800, 1100 may be provided with one or more collapsible or foldable segments. Referring now to FIGS. 12a through 12c, there is seen a device 1200 in accordance with the present invention. Device 1200 is similar to devices 400a, 400b, 400c, 400d, except that device 1200 is provided with collapsible segments 1205a, 1205b, 1205c, . . . 1205n. When collapsible segments 1205a, 1205b, 1205c, . . . 1205n are set to a loose configuration, as depicted in FIG. 12a, device 1200 may be easily collapsed for storage or transportation, as shown in FIG. 12b. When collapsible segments 1205a, 1205b, 1205c, . . . 1205n are positioned in a tightened configuration, as shown in FIG. 12c, device 1200 assumes proper shape for use. In one embodiment, collapsible segments 1205a, 1205b, 1205c, . . . 1205n are each provided with a hinge for connecting to an adjacent segment, whereby segments 1205a, 1205b, 1205c, . . . 1205n are foldable at the hinges. At least one of the hinges of segments 1205a, 1205b, 1205c, . . . 1205n may be provided with a locking mechanism to selectively lock the hinge into a desired configuration.

While the present invention has been illustrated by description of various embodiments and while those embodiments have been described in considerable detail, it is not the intention of applicants to restrict or in any way limit the scope of the invention to such details. Additional advantages and modifications will readily appear to those skilled in the art. The invention in its broader aspects is therefore not limited to the specific details and illustrative examples shown and described. Accordingly, departures may be made from such details without departing from the spirit or scope of the invention.

What is claimed is:

1. A device for adjusting a position of eyeglasses on a face of a user, the device comprising:
   an elongated body having proximal and distal ends, the elongated body being provided with a pronounced anteriorly directed bow;
   a bifurcated nose engaging member extending from the proximal end of the body, the nose engaging member being structured to engage with a bridge of a nose of the user; and
   at least one frame engaging member extending from the distal end of the body, the frame engaging member including a superior facing U-shaped recess having a substantially planar anteriorly extending floor for receiving a frame of the eyeglasses,
   wherein the pronounced bow of the body and the U-shaped recess of the frame engaging member are sized sufficiently to allow a horizontal position adjustment of the eyeglasses with respect to the face of the user.

2. The device of claim 1, wherein the body is constructed from at least one of metal, silicone, plastic, resin, composites, rigid 3D printed materials, non-corrosive materials, and stiff hypoallergenic materials.

3. The device of claim 1, wherein at least one of the nose engaging member and the frame engaging member is malleable.

4. The device of claim 3, wherein the body is malleable.

5. The device of claim 1, further comprising nose pads disposed on the nose engaging member, the nose pads structured and positioned to engage with the bridge of the nose when the device is worn by the user.

6. The device of claim 1, wherein at least one of the body, the nose engaging member, and the frame engaging member is constructed from a plurality of collapsible and/or removable segments.

7. The device of claim 1, wherein the nose engaging member includes first and second legs forming a narrow apex therebetween, the first and second legs flaring outwardly from the body.

8. The device of claim 1, wherein the anteriorly extending floor is sloped substantially horizontal and extends perpendicular or substantially transverse to the elongated body.

9. The device of claim 1, wherein the frame of the eyeglasses can be slidably positioned along the length of the anteriorly extending floor to adjust a horizontal position of the eyeglasses with respect to the face of the user.

10. The device of claim 1, wherein the frame engaging member includes a looped handle for gripping the device.

11. A device for adjusting a position of eyeglasses on a face of a user, the device comprising:
   an elongated body having proximal and distal ends, the elongated body being provided with a pronounced anteriorly directed bow;

a bifurcated nose engaging member extending from the proximal end of the body, the nose engaging member being structured to engage with a bridge of a nose of the user; and at least one frame engaging member extending from the distal end of the body, wherein the frame engaging member includes a superior facing U-shaped recess having a substantially planar anteriorly extending floor for receiving a frame of the eyeglasses to allow a vertical position adjustment of the eyeglasses with respect to the face of the user, and wherein the pronounced bow of the body and the U-shaped recess of the frame engaging member are sized sufficiently to allow a horizontal position adjustment of the eyeglasses with respect to the face of the user.

12. The device of claim 11, wherein the body is constructed from at least one of metal, silicone, plastic, resin, composites, rigid 3D printed materials, non-corrosive materials, and stiff hypoallergenic materials.

13. The device of claim 11, wherein at least one of the nose engaging member and the frame engaging member is malleable.

14. The device of claim 13, wherein the body is malleable.

15. The device of claim 11, further comprising nose pads disposed on the nose engaging member, the nose pads structured and positioned to engage with the bridge of the nose when the device is worn by the user.

16. The device of claim 11, wherein at least one of the body, the nose engaging member, and the frame engaging member is constructed from a plurality of collapsible and/or removable segments.

17. The device of claim 11, wherein the nose engaging member includes first and second legs forming a narrow apex therebetween, the first and second legs flaring outwardly from the body.

18. The device of claim 11, wherein the anteriorly extending floor is sloped substantially horizontal and extends perpendicular or substantially transverse to the elongated body.

19. The device of claim 11, wherein the frame of the eyeglasses can be slidably positioned along the length of the anteriorly extending floor to adjust a horizontal position of the eyeglasses with respect to the face of the user.

20. The device of claim 11, wherein the frame engaging member includes a looped handle for gripping the device.

* * * * *